United States Patent [19]

Yates et al.

[11] Patent Number: 4,655,828

[45] Date of Patent: Apr. 7, 1987

[54] SEPARATION OF METALLIC LITHIUM

[75] Inventors: Stephen F. Yates, Arlington Heights, Ill.; Kim L. Johnson, Phoenix, Ariz.

[73] Assignee: The Garrett Corporation, Los Angeles, Calif.

[21] Appl. No.: 811,562

[22] Filed: Dec. 20, 1985

[51] Int. Cl.$^4$ .................. C01D 15/00; C22B 26/12
[52] U.S. Cl. .............................. 75/97 A; 75/101 R; 75/114; 75/121; 423/179.5; 423/191; 423/197; 423/202; 423/205; 423/208
[58] Field of Search .................. 423/179.5, 191, 197, 423/202, 205, 208; 75/101 R, 114, 121, 97 A

[56] References Cited

U.S. PATENT DOCUMENTS

| 2,059,750 | 11/1936 | Roder et al. | 423/179.5 |
| 4,285,914 | 8/1981 | Davidson | 423/179.5 |

FOREIGN PATENT DOCUMENTS

| 569732 | 1/1959 | Canada | 423/179.5 |
| 891785 | 3/1962 | United Kingdom | 423/179.5 |

*Primary Examiner*—John Doll
*Assistant Examiner*—Robert L. Stoll
*Attorney, Agent, or Firm*—Terry L. Miller; Albert J. Miller

[57] ABSTRACT

Lithium metal is separated from lithium salts in spent torpedo boiler fuel by solubilizing said salts in a solution of a Lewis acid such as boron trifluoride in a polar solvent such as 1,2-dimethoxyethane followed by subsequent separation of the constituents of said mixture.

13 Claims, No Drawings

SEPARATION OF METALLIC LITHIUM

BACKGROUND OF THE INVENTION

One of the ways to power a torpedo is to utilize metallic lithium mixed with sulfur hexafluoride as a fuel. This fuel is placed in a boiler and ignited, thereby generating the heat necessary to boil the working fluid and drive the propeller. The engines of the torpedoes are run for varying periods of time resulting in mixtures of spent fuel in which large amounts of lithium fluoride and lithium sulfide are present in the reaction products. After completion of a test run, the spent fuel is present in the boiler as a solid cake consisting essentially of lithium fluoride and lithium sulfide within which lithium metal is still present. Decontamination of this boiler is expensive and hazardous since lithium reacts slowly in air and violently with water, and in addition the lithium fluoride is both toxic and insoluble in most solvents.

Manufacturers and users of these torpedo boilers have to find some method to solve the decontamination problem. The boiler is an integral part of the torpedo and it would be preferable to clean the boiler intact prior to possible reuse. At present, the process used consists of attempting to break up the lithium fluoride matrix by severing the boiler and subjecting it to pulses from a water cannon. This process is hazardous in that the lithium produces flammable hydrogen gas in the presence of water and because of the aforesaid lithium fluoride toxicity. It is therefore desirable to discover a solvent-based system for dissolving the lithium fluoride matrix, thereby releasing the unreacted lithium metal and permitting recovery of lithium and its salts.

SUMMARY OF THE INVENTION

This invention relates to a process to dissolve lithium salts in the presence of lithium metal from a mixture of spent torpedo boiler fuel. More specifically, the invention is concerned with the solubilization of the lithium fluoride and lithium sulfide matrix so as to release the unreacted lithium metal and to permit the reuse of the boiler as well as the recovery of the lithium salts and lithium metal.

As was discussed previously, the solubilization of lithium fluoride is the major concern in this process. Prior work shows that lithium fluoride is not soluble to a great extent in any organic solvent in water, or water to which acid has been added, but that at ambient temperature about 5.8% solubility could be effected through use of liquid hydrogen fluoride, a dangerous chemical in itself. We have unexpectedly found that the use of a Lewis acid dissolved in a polar organic solvent increased the solubility of lithium fluoride at ambient temperature.

It is therefore an object of this invention to provide a process for dissolving lithium salts from mixtures of the same containing lithium metal without reacting appreciably with the lithium metal.

It is a further object of this invention to provide a reasonably fast method to achieve the solubilization of the lithium fluoride which avoids the hazards of destroying the lithium in situ.

In one aspect, an embodiment of this invention resides in a process for separating lithium from a mixture of metallic lithium and lithium salts which comprises contacting said mixture of metallic lithium and lithium salts with a solution comprising a Lewis acid dissolved in a polar solvent at a temperature and for a time sufficient to afford solubilization of said salts in said solution and subsequently separating and recovering said unreacted metallic lithium and said lithium salts.

A specific embodiment of this invention is found in a process for the dissolving of lithium fluoride from a mixture of metallic lithium and lithium salts comprising contacting said mixture with a Lewis acid dissolved in a polar solvent at a temperature and for a time sufficient to dissolve the lithium fluoride without reacting with the lithium metal.

Another specific embodiment of this invention is found in a process for the removal of lithium fluoride from a mixture comprising lithium fluoride, lithium sulfide, and metallic lithium, said process comprising the contacting of said mixture with a solution of boron trifluoride in 1,2-dimethoxyethane at ambient temperature for a time long enough to dissolve the lithium fluoride matrix.

Other objects and embodiments will be found in the following further detailed description of the present invention.

DETAILED DESCRIPTION OF THE INVENTION

We have developed an effective procedure for the separation of lithium metal from lithium salts found in spent torpedo boilers. The reaction occurring in the boiler and thereby powering the torpedo is as follows:

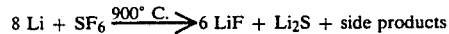

$$8\ Li + SF_6 \xrightarrow{900°\ C.} 6\ LiF + Li_2S + \text{side products}$$

Consequently, after use the boiler is filled with a solid, partially segregated mixture of a salt phase containing lithium fluoride and lithium sulfide and a metal phase containing predominantely lithium metal. Other components of the mixture include sulfur, lithium hydride and side products from the reaction.

As hereinbefore discussed, the decontamination of reacted torpedo boilers is a hazardous operation. The current procedure involves cutting open the boiler and soaking the open end boiler in ethylene glycol with subsequent additions of water over a two to three month period. During this period of time, the boiler is also subjected to water blasting as well as manual chipping out of most of the fluoride rock, an extremely labor intensive operation requiring two to three months to complete. Pursuant to finding a selective leaching agent for the salts phase (predominantly lithium fluoride and lithium sulfide) present in spent torpedo boilers which will not react with the lithium metal inclusions, we have now unexpectedly discovered that solutions of Lewis acids in organic solvents will function in such a manner so as to provide a commercially attractive method for separating unreacted lithium metal from the aforementioned salts and thus permit recovery of said lithium metal for reuse.

The technique can be readily used to separate lithium metal from the salts phase, since on dissolution of the salts, the released metal could be removed by flotation. It has the additional advantages that destruction of the boiler may not be necessary, that the expense of the reagents used may be recovered by sale of the high value lithium tetrafluoroborate by-product, that the time involved to carry out this separation is shortened considerably since a contact time range of from 0.1 to 2.0 hours is sufficient for separation, and that no appreciable temperature elevation occurs. Exemplary separation temperatures range from about 40° to 80° C., preferably from about 25° to 50° C.

It is considered within the scope of this invention to carry out the separation of metallic lithium from lithium salts in any manner known to those skilled in the art. A preferred method might be one in which the separation is carried out in a continuous manner for hours at ambient temperature in a recirculating system wherein the separated metallic lithium is filtered or floated out of the recirculating liquid solvent comprising, as for example, boron trifluoride dissolved in 1,2-dimethoxyethane under a blanket of inert gas such as nitrogen or argon.

The Lewis acid component of the solvent system can be chosen from the group including but not necessarily limited to boron trifluoride, aluminum chloride, boron trichloride, antimony pentachloride, boron triiodide, aluminum iodide, tin tetrachloride, titanium tetrachloride, silicon tetrachloride, and aluminum bromide. By way of example, the boron trifluoride may be employed in an amount ranging from about 1 to 20 weight percent.

The polar solvent component of the system can be chosen from the group including but not necessarily limited to dialkoxyalkanes such as 1,2-dimethoxyethane(glyme), N,N-dimethylformamide, propylene carbonate, tetrahydrofuran, and acetonitrile.

The actual separation process would preferably be carried out on the intact boiler by utilizing a method such as drilling, through the spent boiler fuel to permit access of the recirculating solubilizing solution to the solid spent fuel. Alternatively, the spent fuel may be ground or pulverized prior to contact with the solubilizing medium comprising the Lewis acid dissolved in a polar organic solvent. Any method known to those skilled in the art may be used to prepare the spent fuel for separation.

Another advantage to our invention accrues to the possibility of recovery and reuse of the boron trifluoride and of the 1,2-dimethoxyethane and of the ease of replacing the boron trifluoride which has reacted with lithium fluoride to form the lithium tetrafluoroborate. In addition, our invention does not react with lithium metal thereby causing a concomitant rise in reaction temperature.

As can be seen in Table 1, an increase in solubilization of boron trifluoride results in a corresponding increase in the concentration of lithium fluoride in 1,2-dimethoxyethane. Dissolution of lithium fluoride appears to occur roughly in a 1:1 molar ratio to the boron trifluoride concentration though greater than 1:1 ratios are observed at higher concentrations. The boron trifluoride/1,2-dimethoxyethane solution is also effective in solubilizing lithium sulfide and the same type of concentration effects occur as in the aforementioned case.

TABLE 1

| Boron trifluoride by weight | Lithium fluoride % by weight |
|---|---|
| 3.07 | 1.01 |
| 6.40 | 2.39 |
| 12.54 | 5.64 |
| 18.57 | 8.37 |

EXAMPLE I

One hundred milliliters of dry 1,2-dimethoxyethane and 10.19 grams of lithium fluoride were added to a nitrogen-flushed reaction flask which was equipped with a stirrer and a thermometer. Aliquots of boron trifluoride etherate were added to the stirring contents of the reaction flask and stirring was continued for fifteen minutes during which no detectable temperature rise was observed. Each aliquot addition was followed by fifteen minutes stirring, and, subsequently, fifteen minutes settling, after which the supernatant was sampled and analyzed by atomic absorption spectroscopy for lithium and for boron. The lithium and boron values were then used to calculate the respective quantities of lithium fluoride and boron trifluoride. These values are to be found in Table 2 below.

TABLE 2

| Sample | Weight % Found | | Calculated Weight % | |
|---|---|---|---|---|
| | Li | B | LiF | $BF_3$ |
| 1 | 0.27 | 0.49 | 1.01 | 3.07 |
| 2 | 0.64 | 1.02 | 2.39 | 6.40 |
| 3 | 1.51 | 2.00 | 5.64 | 12.57 |

EXAMPLE II

In like manner as Example I, the dissolution of 10.0 grams of lithium sulfide was studied. The temperature rose 10°-35° C. after each addition and gas evolution accompanied the formation of a green color in the solution. Samples of the supernatant were analyzed as in Example I and the results of analysis are represented in Table 3 below.

TABLE 3

| Sample | Weight % Found | | Calculated Weight % | |
|---|---|---|---|---|
| | Li | B | $Li_2S$ | $BF_3$ |
| 1 | 0.0013 | none | 0.0043 | none |
| 2 | 0.37 | 0.54 | 1.22 | 3.39 |
| 3 | 0.20 | 0.31 | 0.66 | 1.94 |
| 4 | 3.38 | 3.51 | 11.19 | 22.02 |

EXAMPLE III

In like manner as in Example I, 3.95 grams of crushed boiler solids were dissolved in 1,2-dimethoxyethane. No temperature rise was discernable after each aliquot addition and the results of supernatant analysis is presented in Table 4 below. Granules of lithium metal remained visible throughout this procedure and were still present 24 hours later.

TABLE 4

| Sample | Weight % Found | |
|---|---|---|
| | Li | B |
| 1 | 0.0021 | none |
| 2 | 0.23 | 0.47 |
| 3 | 1.05 | 2.32 |
| 4 | 1.23 | 3.73 |

We claim as our invention:

1. A process for the separation of metallic lithium from a mixture of metallic lithium and lithium salts which process comprises contacting said mixture of metallic lithium and lithium salts with a solution comprising a Lewis acid dissolved in a polar solvent at a temperature and for a time sufficient to effect solubilization of said lithium salts in said solution and subsequently separating and recovering said solubilized lithium salts from non-solubilized metallic lithium, said lithium salts being selected from the group consisting of lithium sulfide and lithium fluoride, said Lewis acid being selected from the group consisting of boron trifluoride, aluminum chloride, boron trichloride, antimony pentachloride, boron triiodide, aluminum iodide, tin tetrachloride, titanium tetrachloride, silicon tetrachloride and aluminum bromide, and said polar solvent being selected from the group consisting of dialkoxyalkanes, N,N-dimethylformamide, propylene carbonate, tetrahydrofuran and acetonitrile.

2. The process as set forth in claim 1 wherein said temperature is within the range of from about 40° C. to about 80° C.

3. The process as set forth in claim 2 wherein said temperature is within the range of from about 25° to about 50° C.

4. The process as set forth in claim 1 wherein said contact time ranges from about 0.1 to about 2.0 hours.

5. The process as set forth in claim 1 wherein said polar solvent is 1,2-dimethoxyethane.

6. The process as set forth in claim 1 wherein said polar solvent is propylene carbonate.

7. The process as set forth in claim 1 wherein said polar solvent is N,N-dimethylformamide.

8. The process as set forth in claim 1 wherein said Lewis acid is aluminum chloride.

9. The process as set forth in claim 1 wherein said Lewis acid is phosphorous pentachloride.

10. The process as set forth in claim 1 wherein said Lewis acid is boron trifluoride.

11. The process as set forth in claim 9 wherein said boron trifluoride is present in the range of from about 1 to about 20% by weight.

12. The process as set forth in claim 1 wherein said lithium salt is lithium fluoride.

13. The process as set forth in claim 1 wherein said lithium salt is lithium sulfide.

* * * * *